Oct. 30, 1962   W. P. TAYLOR, JR   3,061,238
WINDING FLEXIBLE MATERIAL
Filed Aug. 14, 1957   11 Sheets-Sheet 5
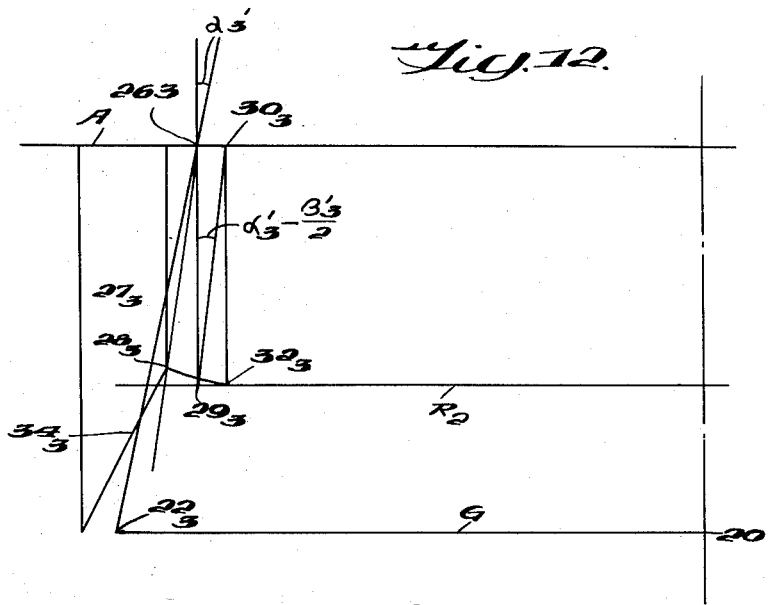
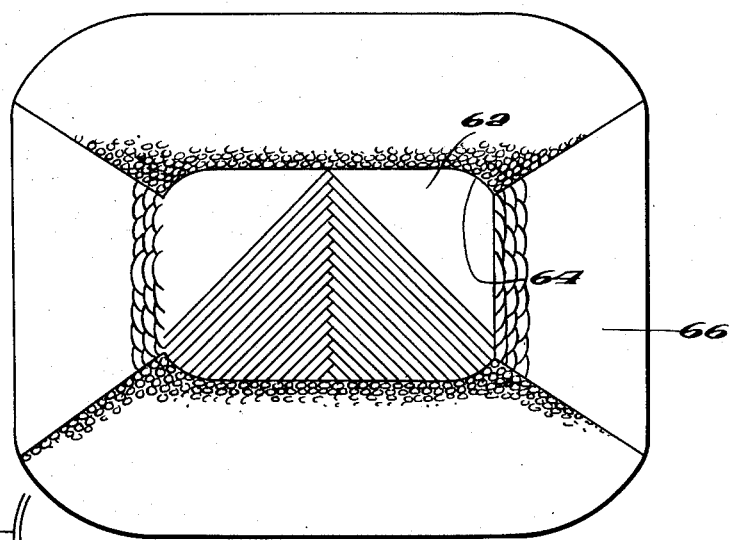
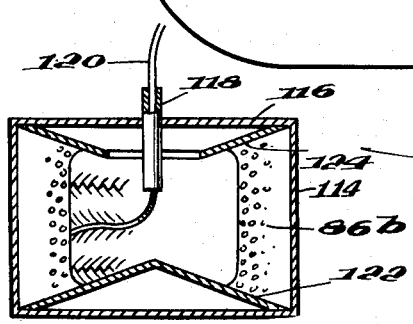
INVENTOR
Walter P. Taylor, Jr.
BY Bailey, Stephens & Huettig
ATTORNEYS Oct. 30, 1962 W. P. TAYLOR, JR 3,061,238
WINDING FLEXIBLE MATERIAL
Filed Aug. 14, 1957 11 Sheets-Sheet 6
Fig. 14.
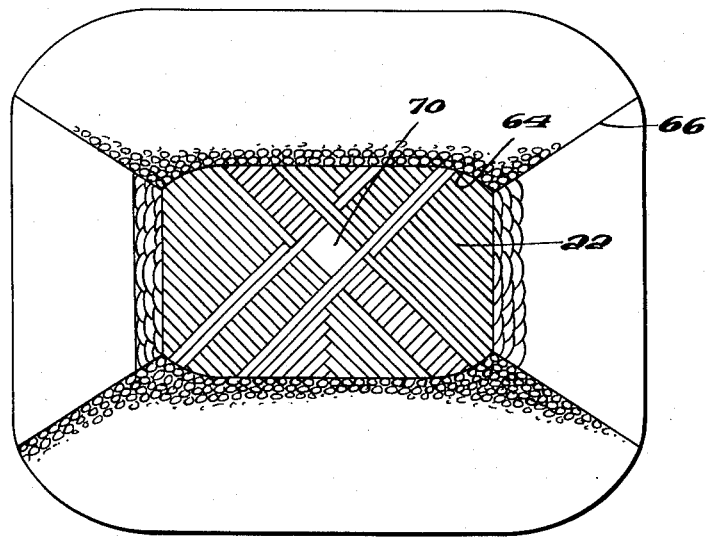
Fig. 15A. Fig. 15B.
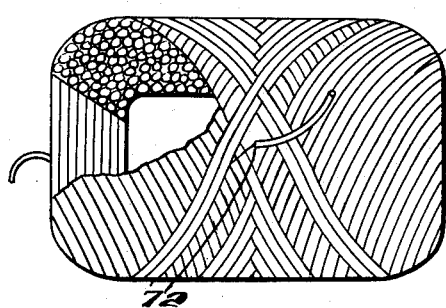 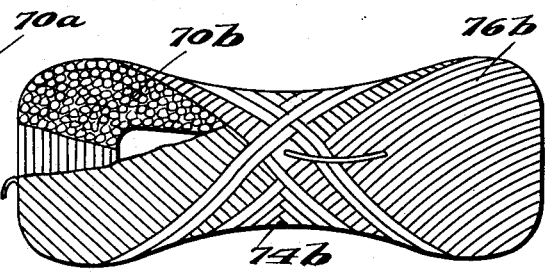
Fig. 15C.
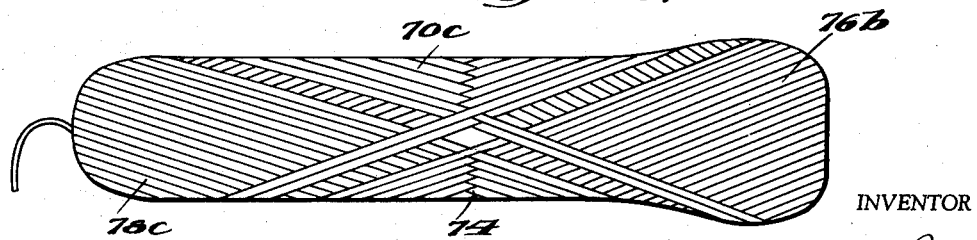
INVENTOR
Walter P. Taylor, Jr.
BY Bailey, Stephens & Huettig
ATTORNEYS

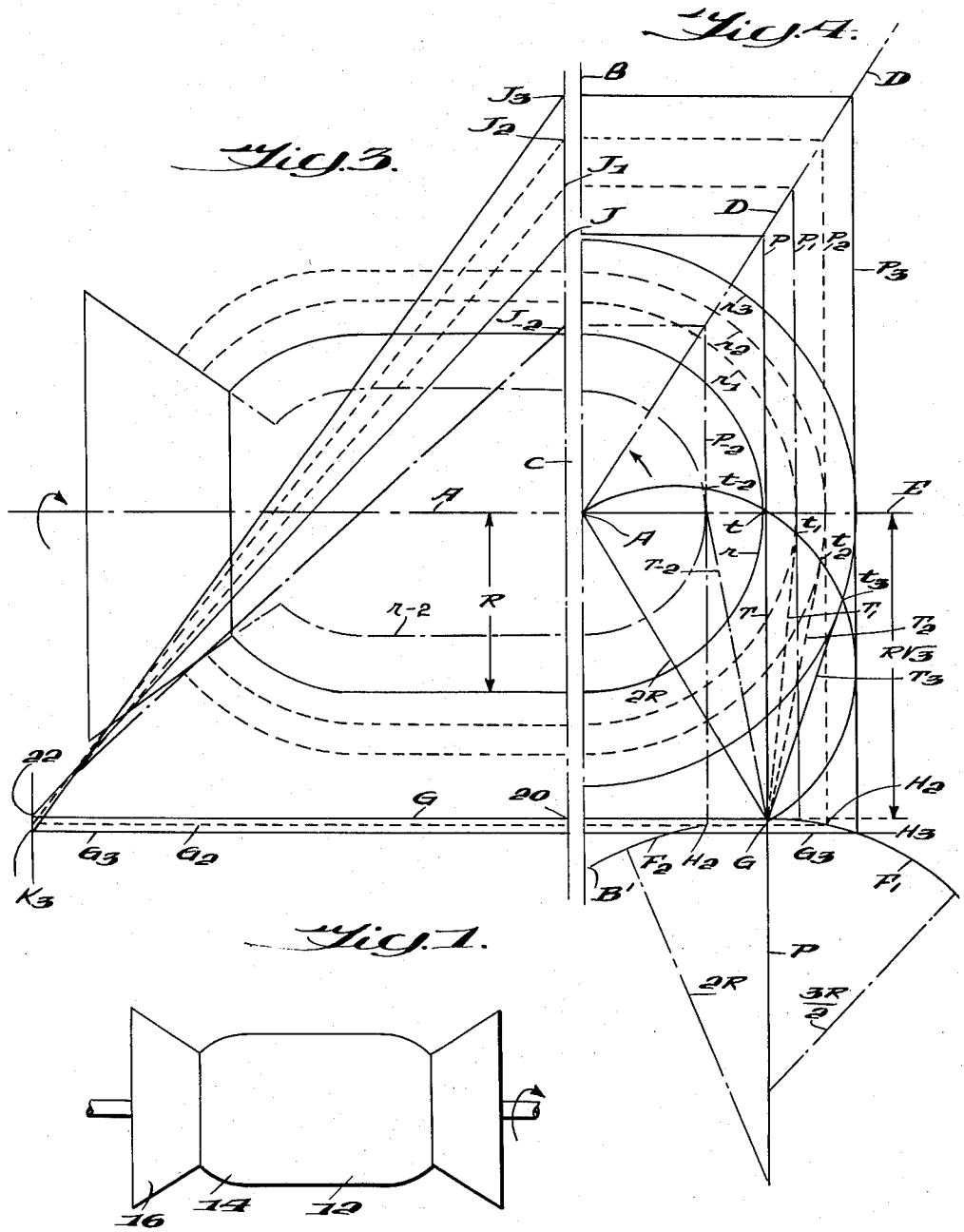

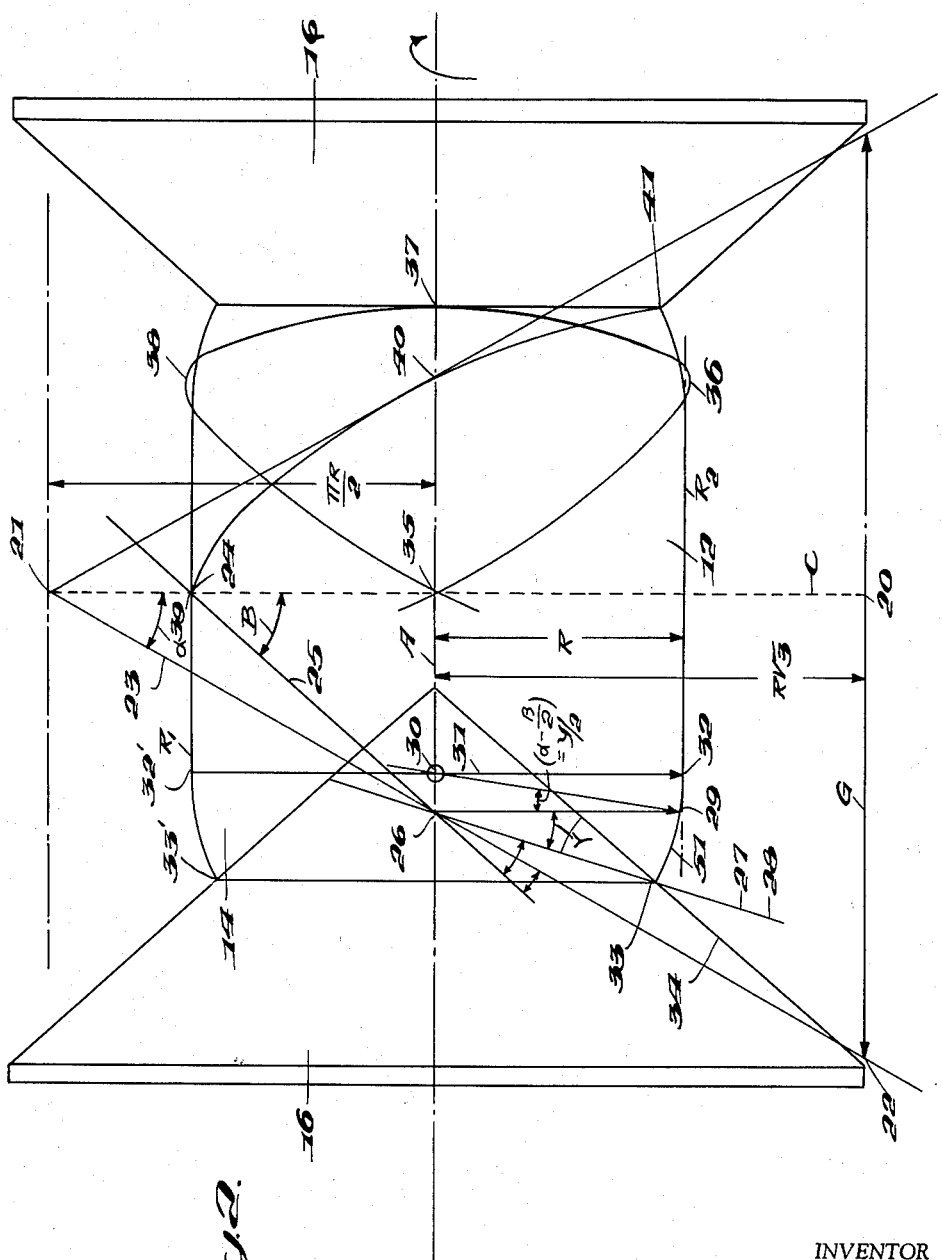

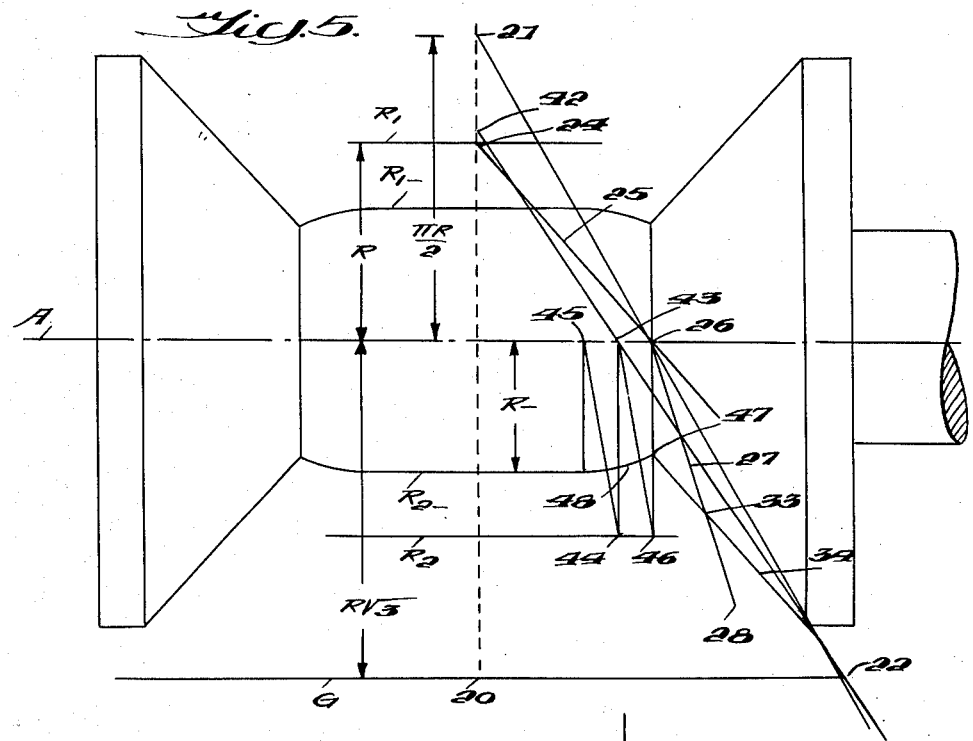
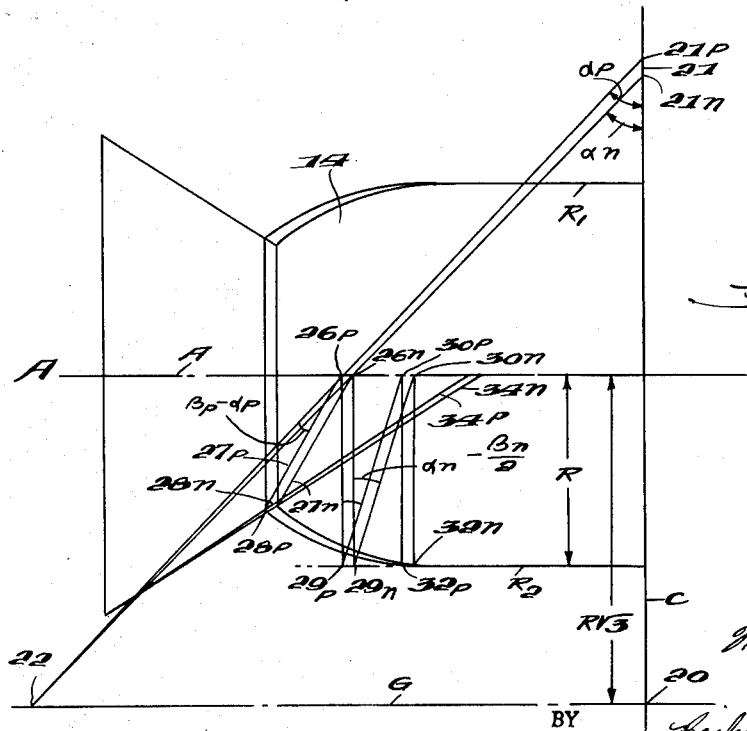

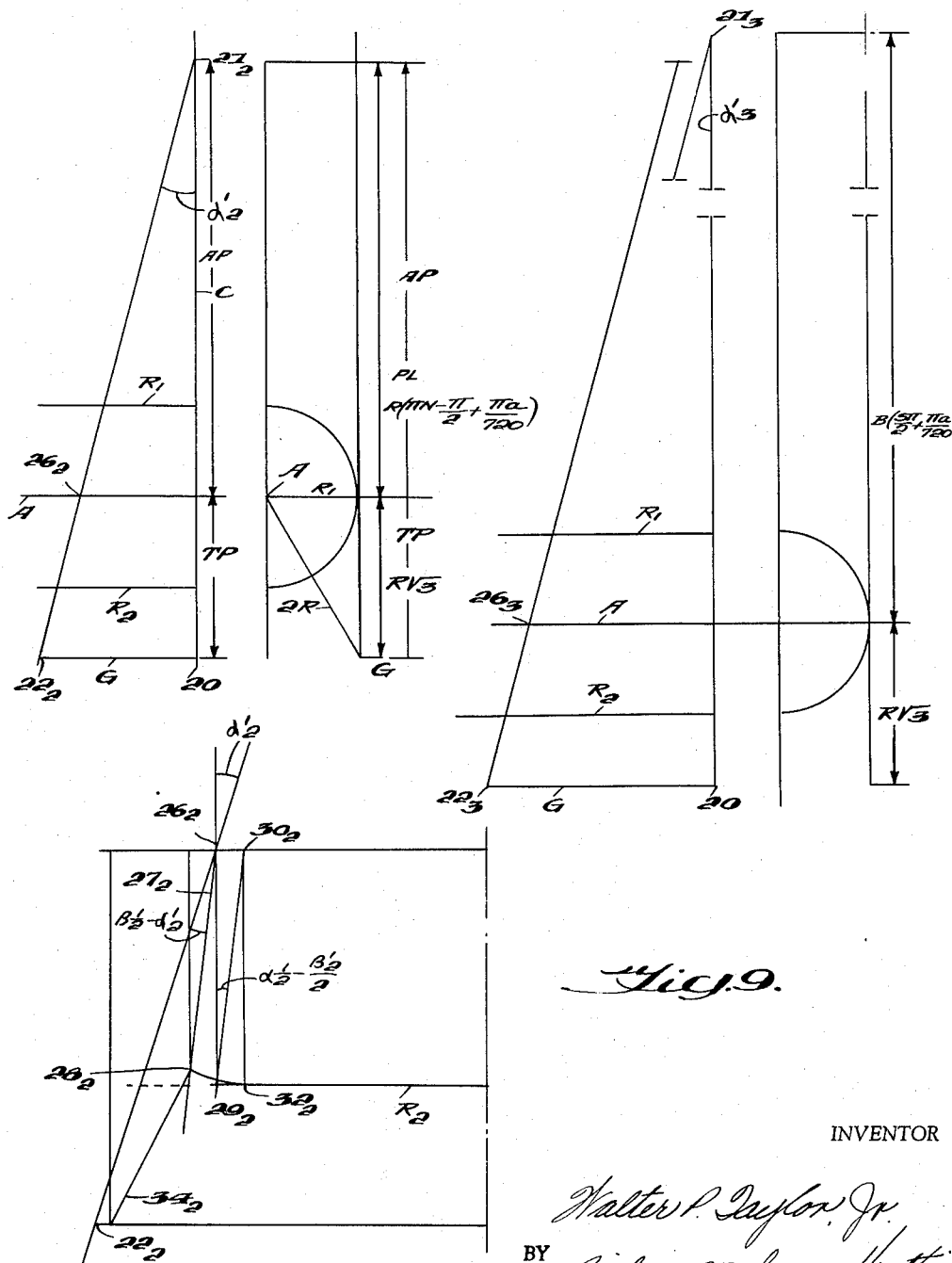

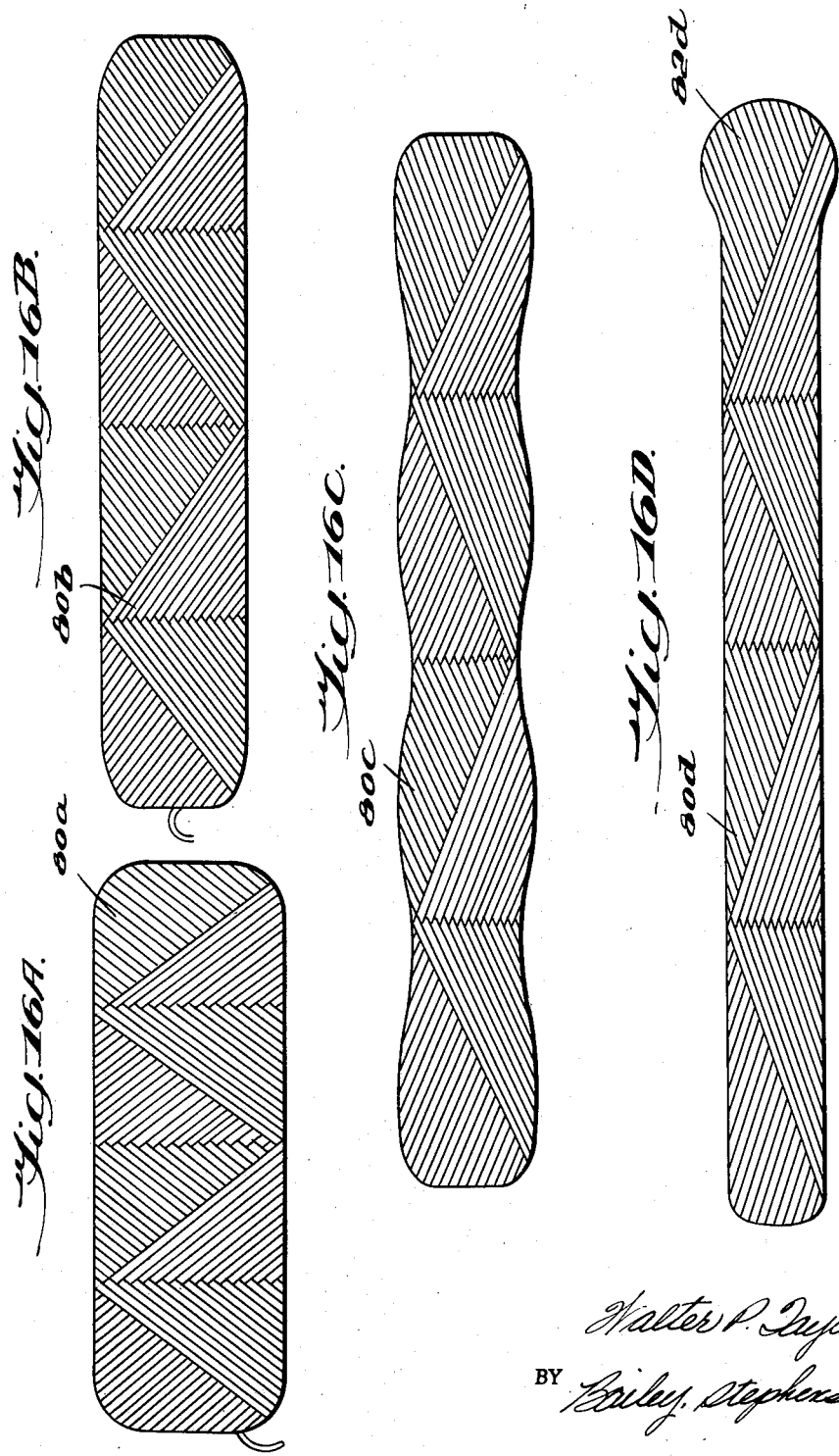

Oct. 30, 1962 W. P. TAYLOR, JR 3,061,238
WINDING FLEXIBLE MATERIAL
Filed Aug. 14, 1957 11 Sheets-Sheet 8

INVENTOR
Walter P. Taylor, Jr.
BY Bailey, Stephens & Huettig
ATTORNEYS

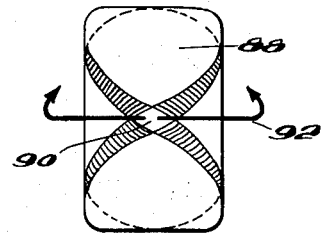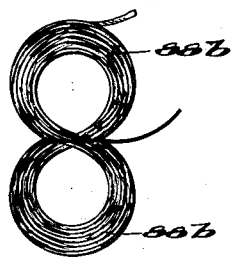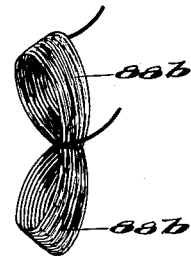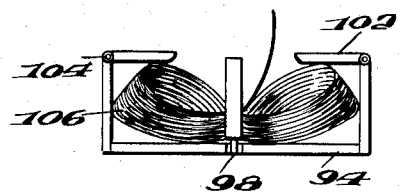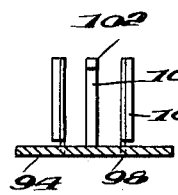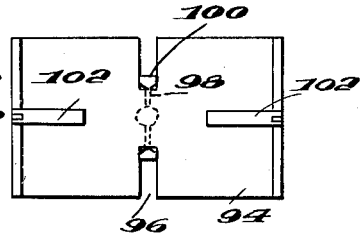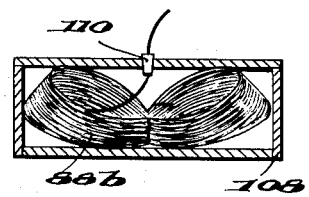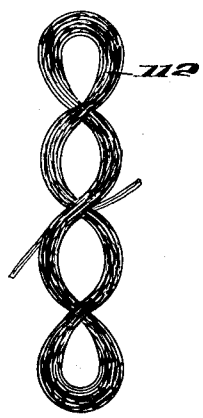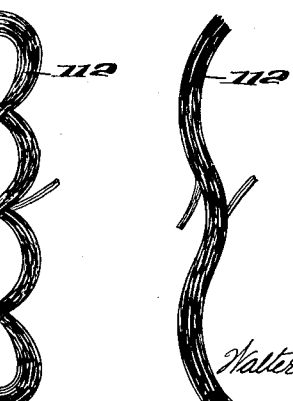

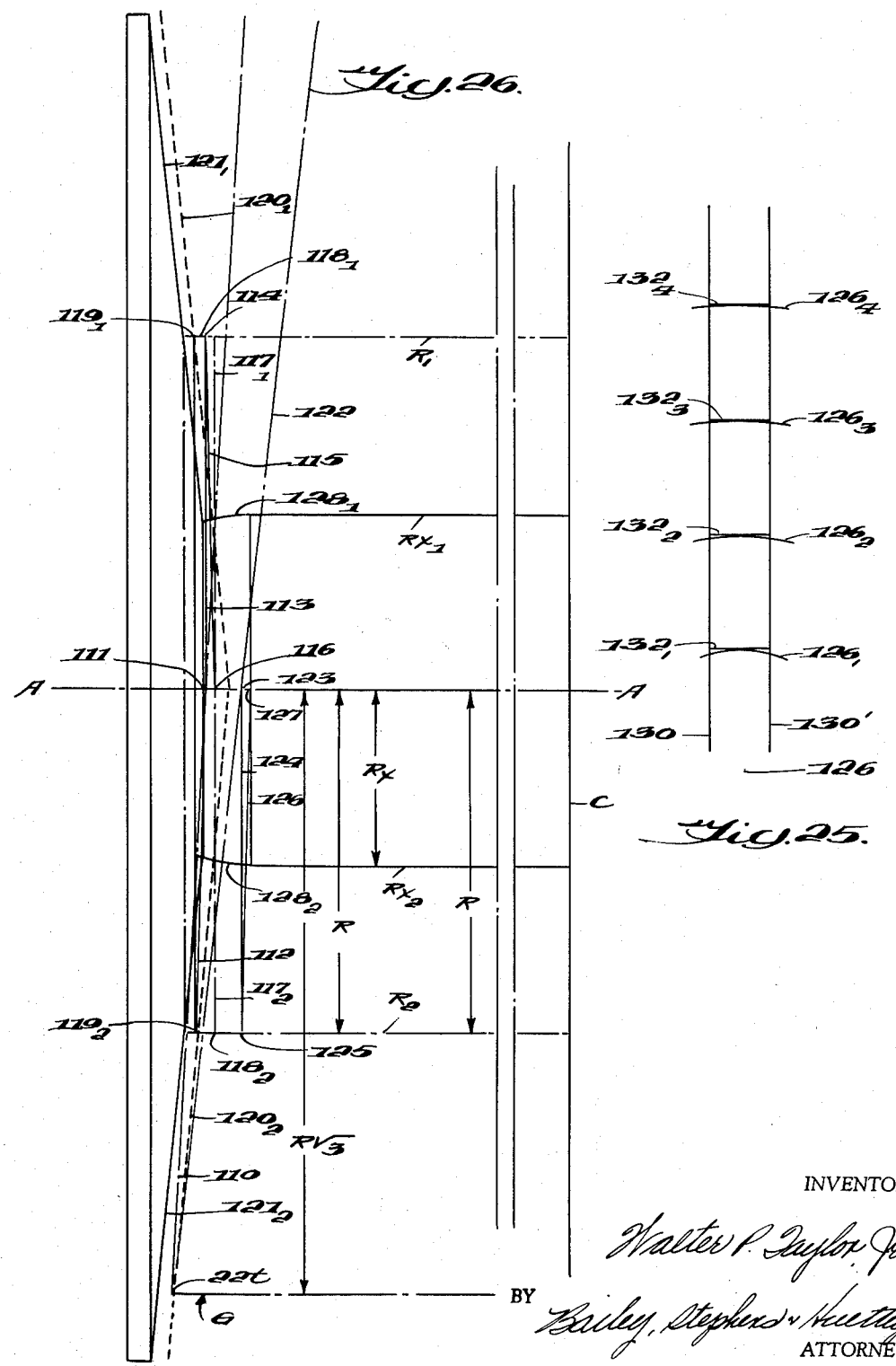

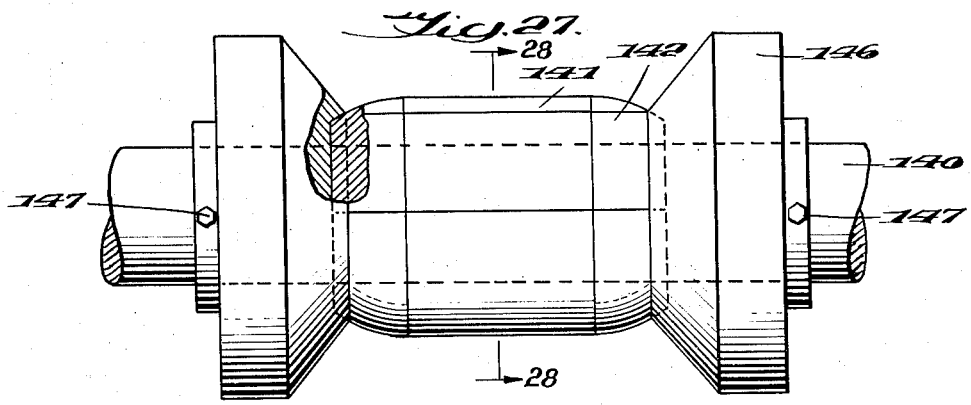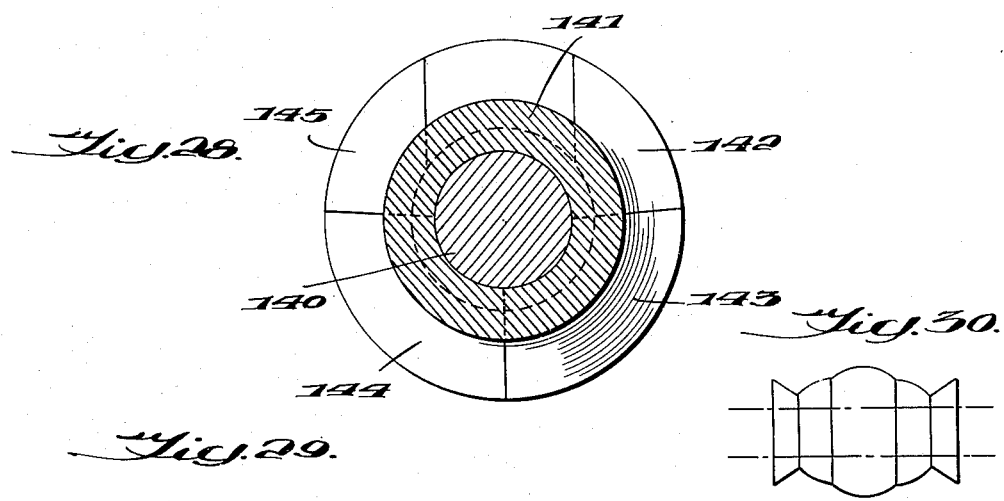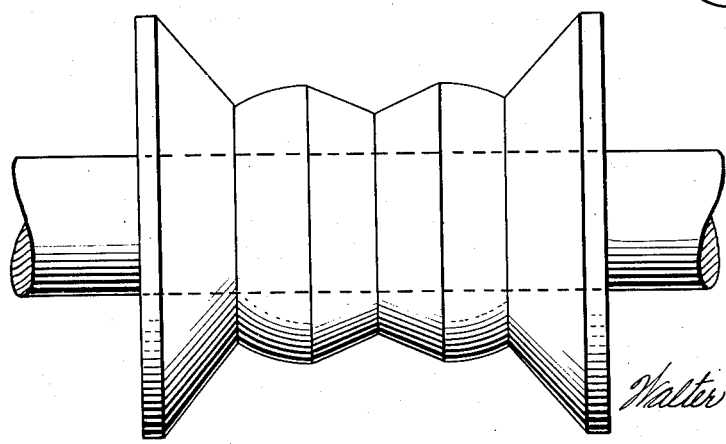

United States Patent Office 3,061,238
Patented Oct. 30, 1962

3,061,238
WINDING FLEXIBLE MATERIAL
Walter P. Taylor, Jr., New York, N.Y., assignor of one-half to James W. Newman
Filed Aug. 14, 1957, Ser. No. 678,106
5 Claims. (Cl. 242—163)

The invention relates to machines and methods of winding long lengths of flexible material such as wire, yarn, thread, rope, ribbon, tape, cable, and the like, and to methods of modifying and packaging such windings, to the packages so produced, and to the spools on which the packages are wound. More especially, it relates to the winding and packaging of any bendable filamentous or ribbon-like substance, including all cross sectional shapes of wire or other substances and especially those with slippery surfaces.

The primary object of the invention is to produce an improved package or coil of flexible material in which the substance crosses over itself at relatively widely spaced intervals to avoid destructive bends from the scissors action of close crossovers, is reversed at the ends of the pack without angular deflection, is laid on under low tension so that the substance is maintained under minimum pressure and to avoid collapse when the center piece is removed, and yet remains completely self-supporting so that the line can be withdrawn from either the center or the outside from either end.

A further object of the invention is to provide a special shape of spindle and a machine utilizing such a spindle for winding the desired package.

Heretofore, completely self-supporting winds in this art have been dependent on the bonding quality or frictional adherence of the wound substance, plus close lay of adjacent coils (closed advance) and high tension on the winding line, two conditions which combine to increase the bonding effect by crimping-in the line during winding and thereafter holding it in place under pressure.

Because many substances lack sufficient bonding quality (are too slippery or too hard-and-round) to be held securely, either during the winding or after, and because most are damaged or deformed by the shearing action of adjacent strands in close lay winds, by lengthwise stretch from high tension, by bends and rubbing from being pulled at high tension over the angular structure of the ends of this form of winding, by bends in the line from angular deflection in the path of the wind at the ends, or by the pressure of strand on strand that is built up in the wall of a long length winding, these completely self-supporting winds have been utilized for only a few substances such as cord and rope and in relatively short lengths. In addition, development has been restricted almost entirely to the "ball of cord" or "one-half wind" type which lacks adaptability to changes in shape or winding angle, is limited in relative size (length that can be wound), and has little stability for anything but cord. In addition, this form allows no equalization of twist, being wound without the radial hole described in my Patent No. 2,634,922.

It is an object of the present invention to eliminate all of these difficulties. It provides a self-supporting winding and the mandrel and end forms on which it is to be wound, fitted to the specific conditions of any machine of the quick traverse type. In addition, since it can be worked out for any size and for any angle of wind, it produces wound packages with the best combination of self-supporting wind characteristics for any substance, for any particular use, and for any package type or dimensions, and provides the mandrel shape and the machine settings necessary for winding it.

The invention also provides the method of designing an improved spool or mandrel for taking up and paying out any bendable substance, particularly flat or tapelike substances which heretofore have proved troublesome and which frequently require complicated machinery for successful winding on reels or spools of current design.

Another object of the invention is to produce variations of the same winding which contain a hole radially through the wall, yet which remain completely self-supporting so that the line can be withdrawn from the inside through the radial hole.

One more object of the invention is to provide a method of designing ends for any shape of the central part of a mandrel, across which it is known that a winding line will traverse, so that the combination will fit predetermined machine adjustments of reasonable size (or so that correct machine adjustments can be determined for a preferred combination), a complete mandrel can be constructed correctly and the combination of center and ends will prove windable and will result in a self-supporting package.

Another object of the invention is to provide a method of designing by which self-supporting end formations, such that the wound substance is not subjected to angular bends in turning back, can be provided for any shape of "regular" (as opposed to "random") winding.

Still a further object of the invention is to produce variations of the same windings which are contracted or collapsed circumferentially in some part or over all their lengths or are partially or completely flattened circumferentially.

It is also an object of the invention to produce variations of the same windings which are contracted or collapsed axially. Some of these lose their initial form characteristics yet leave a coil pack composed of a series of coils each of which is proportioned and positioned so as to maintain its relationship to the other coils and to facilitate an orderly, resistanceless withdrawal in one of the ways specified above, the air spaces between the coils having been virtually eliminated.

An additional object of the invention is to produce variations of the type containing a radial hole which are collapsed radially from each side of the radial hole so as to leave a series of nested figure eight coils.

Still another object of the invention is to provide packaging of such coils with regard to their characteristics gained from the above processing so as to protect them during handling and to facilitate withdrawal of the substance with the least resistance and with the minimum possibility of harming the substance during the withdrawal.

This application is a continuation-in-part of my prior application Serial No. 344,875, filed March 26, 1953, now Patent No. 2,828,092 which in turn was a continuation-in-part of my application Serial No. 107,165, filed July 28, 1949, now Patent No. 2,634,922.

In my prior applications, referred to above, I have described certain package shapes in connection with a coil formed of figure eights and having a radial hole into the central axial hole through which the inner end of the material can be drawn out. I have now found that the principle of these shapes, if the proper relative dimensioning of the parts is observed, is applicable to windings which do not have radial openings, and that improved packages, both with and without such openings, can be produced; also, that the principle on which successful winding of such shapes depends is a system of forming wound ends which can be applied successfully to any type of windings except those which might be considered truly random.

Further objects and advantages of the invention will appear more fully from the following description, especially when taken in conjunction with the accompanying drawings which form a part thereof.

In the drawings,

FIGURE 1 illustrates diagrammatically a machine embodying the invention;

FIGURE 2 shows the basic manner of determining the shape of a spindle according to the invention;

FIGURES 3 and 4 are explanatory diagrams in connection with FIGURE 2;

FIGURE 5 shows the manner of forming a spindle having a radius less than the base radius;

FIGURE 6 shows the way of forming a spindle for a "Universal" one-wind having a positive or negative advance;

FIGURES 7 and 8 show the forming of a spindle for a "two-wind," with a positive advance;

FIGURE 9 is an englargement of a part of FIGURE 7;

FIGURES 10 and 11 show the forming of a spindle for a "three-wind" with a negative advance;

FIGURE 12 is an enlargement of a part of FIGURE 10;

FIGURES 13 and 14 are cross-sections through packages embodying the invention;

FIGURE 15A shows a package produced in accordance with the invention;

FIGURES 15B and 15C show the package of FIGURE 15A collapsed in two different ways;

FIGURE 16A shows another package embodying the invention;

FIGURES 16B, 16C and 16D show the package of FIGURE 16A collapsed in various ways;

FIGURE 20A shows a package which is to be circumferentially collapsed;

FIGURES 20B and 20C show, in front view and side elevation, the package produced by the circumferential collapse of the package of FIGURE 20A;

FIGURE 21A shows in side elevation a holder for the package of FIGURE 20B;

FIGURE 21B is an end view of this holder;

FIGURE 21C is a top plan view thereof;

FIGURE 22 shows another form of holder;

FIGURES 23A and 23B are a front view and a side elevation respectively of a circumferentially collapsed package of a "two-wind";

FIGURE 24 shows another type of holder for packages embodying the invention;

FIGURE 25 is an explanatory diagram for the spooling of flat material;

FIGURE 26 shows the spool for winding flat material in side elevation;

FIGURE 27 shows the construction of a spindle embodying the invention;

FIGURE 28 is a cross-section on the line 28—28 of FIGURE 27;

FIGURE 29 shows a spindle in which the central portion is not cylindrical; and

FIGURE 30 shows still a further form of mandrel.

FIGURE 1 shows diagrammatically a basic form of machine for winding flexible material embodying the invention. This diagram is based on a zero advance and a "one" wind, that is, a wind in which the spindle makes two complete revolutions for each complete reciprocation of the guide.

Figure 17A:
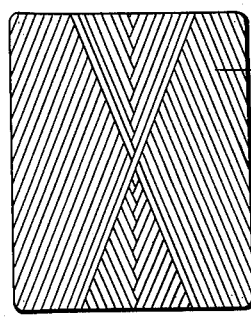
FIGURE 17A shows another type of package embodying the invention.

Such a machine, according to the invention, includes a spindle having cylindrical central portion 12, portions 14 of outwardly decreasing diameter at each end of the central portion, and outwardly flaring end forms 16 beyond portions 14, and a guide 18 for the flexible material, which moves parallel to the spindle axis.

The basic form of spindle shown in FIGURE 2 is for a "one" wind with zero advance. Later figures show the adaptation of this form to advancing (positive or negative or plus-minus) winds and to winds of a different number or order than "one," as well as the adaptation of the end formations of the type shown in this figure to a wind of any shaped central portion.

In the basic machine, the cylindrical portion 12 of the spindle or mandrel has a radius R. The guide 18 moves at a distance 2R from the axis of the spindle (see FIGURE 4); in FIGURE 2, the distance is less since, as will be explained below, this is a projection of the guide's travel on a plane at an angle of 30° through the spindle axis.

With reference to FIGURE 2, the guide is assumed to travel in a path G, the axis of the spindle being shown at A, and the center line at C perpendicular to and passing through the center 20 of line G. The central cylindrical portion of the spindle is represented by lines $R_1$, $R_2$ on either side of axis A, parallel thereto and at a distance R therefrom.

To lay out the cross-section of the spindle or mandrel, I lay off on the center line C from axis A a distance equal to $\pi R/2$ to point 21, this representing one-fourth the circumference of the central portion of the spindle. Line G (in this drawing) is at a distance $R\sqrt{3}$ from the spindle axis on the other side from point 21. Angle 22—21—20 is called the winding angle (angle $\alpha$, in this case 30°), representing the angle at which the material is wound on the central portion of the mandrel in the first layer. Line 23 from 21 to 22 indicates the winding line laid out flat.

I now locate point 24 on center line C at a distance R from the spindle axis and draw a line 25 from this point to point 26 (the common or over-the-axis point) where line 23 intersects axis A. Angle 20—24—26 is designated angle B, the cylindrical helix "generating line" angle. Through point 26 I draw another line 27 on the other side of the axis from line 25 and forming the same angle with line 23 to point 28. I also draw a line through point 26 perpendicular to axis A to its intersection at point 29 with line $R_2$. Angle 28—26—29 is designated angle $\gamma$ (in this case 17° 47½'). Through point 29 I draw a line sloping inwardly toward the axis A and intersecting it at 30, the the angle 26—29—30 being equal to half the angle $\gamma$ (8° 53¾'). I then draw a line 31 (junction line) through 30 perpendicular to axis A, this line indicating the plane of one end of the cylindrical portion 12 of the spindle and intersecting line $R_2$ at 32 and $R_1$ at 32'.

With 30 as a center and R as a radius, I describe an arc 51 from point 32 to point 33 on line 27. This curve represents the outline of the portion 14 of the spindle of outwardly decreasing diameter.

Through point 33, I draw a line 34 parallel to line 25 and extending out as far as line G. This line represents the outwardly flaring end form 16.

The remainder of the spindle is laid out symmetrically, and this represents the cross-section of the spindle.

The shape of the basic spindle is determined entirely by the chosen winding angle, the radius of the spindle and the length of the guide stroke. If any two of these are known, all other values and angles can be calculated.

Assuming a spindle of Radius R and a guide having a path of travel 2G, $$\angle \alpha = \tan^{-1} \frac{2G}{(\pi + 2\sqrt{3})} R$$

$$\angle \beta = \tan^{-1} \frac{\pi G}{(\pi + 2\sqrt{3})} R$$

The length of the cylindrical portion 12 (from center line to point 30) is:

$$R\left[\tan\beta - \tan\left(\alpha - \frac{\beta}{2}\right)\right]$$

The axial projection of the arcuate portion 14 is:

$$R \sin(\gamma + \delta)$$

where $$\delta = \sin^{-1}\left(\cos\gamma \tan\frac{\gamma}{2}\right)$$

and $\gamma$ is $2\alpha - \beta$.

The angle of the end form is $\beta$.

In other words, in this base layer of radius R, the distance 33—33′ across the layer is substantially $$2R\left[\tan\beta - \tan\left(\alpha - \frac{\beta}{2}\right) + \cos(\gamma + \delta)\right]$$

The winding angle as set forth in FIGURE 2 is for the layer of radius R. With the same guide distance, this angle will decrease as the layers build up on the spindle, while if a spindle of less diameter is used, the winding angle will be greater.

Referring to FIGURES 3 and 4, FIGURE 4 shows spindle axis A with a series of semicircles $r$, $r_1$ to $r_3$ ($r$ being the base diameter) and $r-2$ (for convenience, circles $r$ and $r_3$ are shown in solid lines, $r_1$ and $r_2$ in broken lines, and $r-2$ in dot and dash lines, the other corresponding lines in the diagram being correspondingly shown). G represents the line of travel of the guide. T, $T_1$ to $T_3$ and $T-2$ lines from G are drawn tangent to the various arcs at $t$, $t_1$ to $t_3$ and $t-2$ respectively.

The winding angle (FIG. 3) at any radius $r$ is determined by a triangle whose base is half the length of the line of travel of the guide, or G, and whose height is the sum of the distance from line G to the point of tangency $t_x$ plus the length of the arc of radius $r_x$ from this point of tangency to the line B displaced by 150° around the axis A from line A—G (FIGURE 4).

The total length of the leg of the winding triangle is laid out on lines P, $P_1$, $P_2$, $P_3$, $P-2$ parallel to the line B and tangent to circles $r$, $r_1$, $r_2$, $r_3$, $r-2$. The quarter of the circumference from line B back towards G can be shown by intersection of a line D, drawn at angle of 32° 29′ to line B, this being the angle whose cotangent equals $\pi/2$. The distance from line E, perpendicular to line B, to line D represents the arc length.

The sum of the distance from point G to tangent points $t$, $t_1$, etc., plus the arc from this tangent point to line B, I have found, is almost exactly equal, when $r_x$ is greater than R, to the distance along line $P_x$ from line D to an arc $F_1$ of a circle whose radius is $3R/2$, whose center is on line P and which passes through point G.

For a radius less than R, the sum of the distance from point G to point $t_x$ plus the arc from this point to line B is substantially equal to the distance along line $P_x$ to an arc $F_2$ of a circle whose radius is $2R$, whose center is on line P and which passes through point G.

Now, by projecting from FIGURE 4 to FIGURE 3, I mark a point such as $J_3$ on center line C of FIGURE 3 opposite the intersection of line $P_3$ with line D. I also draw a line $G_3$ parallel to line G and passing through point $H_3$ where line $P_3$ intersects arc $F_1$, line $G_3$ intersecting at $K_3$ a line perpendicular to G through end point 22 thereof. Angle $K_3$—$J_3$—20 then represents the winding angle for circle $r_3$.

Since the distance 20—22, equal to $$\frac{R(\pi + 2\sqrt{3})\tan\alpha}{2}$$

is the base of the triangle, and the length $P_x$ for any radius $r_x$ is $$\sqrt{4R^2 - r_x^2} + \frac{\pi r_x\left(150° - \cos^{-1}\frac{r_x}{2R}\right)}{180}$$

then the winding angle $\alpha_x$ is $$\tan^{-1}\frac{R(\pi + 2\sqrt{3})\tan\alpha}{2\left[\sqrt{4R^2 - r_x^2} + \dfrac{\pi r_x\left(150° - \cos^{-1}\dfrac{r_x}{2R}\right)}{180}\right]}$$

where R is the radius at which the winding angle $\alpha_x$ has the value $$\tan^{-1}\frac{2\tan\beta}{\pi}$$

$\beta$ being the angle of the conical interior end portions.

The flexible material is wound on the spindle or on the previously wound material in successive figure 8's, the material crossing over itself on the center line C for zero advance or on lines near to and parallel to C for advanced (positive or negative) winds. Each half of the loops which form the figure 8 is divided into two parts, which I have called cylindrical helix and great circle respectively. The portion of the material wound on as the cross-over point turns from the point of tangency $t_x$ (FIG. 4) to the line B is cylindrical helix. During this part of the rotation, the guide is moving outward from its central position to point 22.

When the guide reverses at point 22, reversed great circle begins to form, this continuing while the spindle turns from line $B_1$, opposite line B to point $t_x$.

During the next phase, forward great circle is formed while the spindle turns through the same number of degrees as for reversed great circle, and then cylindrical helix for the balance of the complete revolution back to the cross-over point. The same cycle is then repeated on the other half of the spindle.

In FIGURE 2, I have shown at 35 the cross-over point, at 35—36 the first phase of cylindrical helix, at 36—37 the reverse great circle, at 37—38 the forward great circle, and at 38—35 the second phase of cylindrical helix. I have also shown the appearance of one-fourth of the figure 8 displaced by 90°, 24 being the cross-over point, 24—40 the cylindrical helix and 40—41 the reversed great circle.

A package wound on such a machine will have an internal surface corresponding to the outside of the mandrel, that is, the internal surface will have a central part of cylindrical shape, and two portions of gradually decreasing diameter. The outer surface and all layers composing the winding will have this same shape, the ends of the layers forming outwardly flared or conical ends.

FIGURE 5 shows the construction of a spindle where it is desired to use a minimum diameter less than the base diameter R (that is, less than half the distance between the path of travel of the guide and the axis of rotation of the spindle). In this figure, A is the axis and G is the path of the guide at a distance (as shown in the figure) $R\sqrt{3}$ from the spindle axis. Assuming a diameter R—, less than R, I first locate point 21 on the center line C at a distance $\pi R/2$ from the axis, and draw line 21—22 to one end of guide travel G, intersecting axis A at 26. Now from point 24 on the center line at distance R from the axis I draw line 25 from point 24 through 26. Next, line 27 is drawn, with angle 22—26—28 equal to angle 21—26—24. Point 33 and line 34 (the end cone line), parallel to line 24—26, are constructed as in FIGURE 2.

Lines $R_1$— and $R_2$— are drawn, representing the cylindrical part of the spindle, parallel to and at a distance R— from axis A. Then a line is drawn from point 22 to point 42 on the center line at a distance $\pi R-/2$ from the axis A, this line crossing the axis at point 43. Now a line is drawn through point 43 perpendicular to and intersecting line $R_2$ at 44. From this point a line is drawn inward at an angle to intersect the axis at 45, the angle 43—44—45 being equal to half the angle 33—26—46.

With 45 as a center and radius R—, an arc 48 is drawn from the line $R_2$— to intersect line 34 at 47. This arc and the end cone line 34 constitute the remainder of the shape of this quarter of the cross-section of the spindle.

When a package is wound on such a spindle, the layer of radius R will have substantially the configuration of the outside of the spindle of FIGURE 2, and will satisfy the equations given above.

Of course, in actual practise, it is usual not to have all the crossovers at the same angular position of the spindle but to cause such crossovers to progress angularly around the spindle in the so-called universal wind. This is accomplished by having the rotation of the spindle slightly out of phase with the movement of the guide, so that for example for a "one" wind for each thirty complete reciprocations of the guide the spindle makes sixty-one revolutions (positive advance or "plus" wind) or fifty-nine revolutions (negative advance or "minus" wind).

FIGURE 6 shows the manner of constructing a spindle for either a "plus" or a "minus" wind. Again, A is the axis of rotation of the spindle and G the path of travel of the guide at a distance (in the drawing) of $R\sqrt{3}$ from the axis. The guide actually is positioned at a distance 2R from the axis, but FIG. 6 is a view taken at an angle of 30° to the plane of the guide movement. This figure is based on a winding angle of 45°, and an advance of 6°. Point 21 and lines $R_1$ and $R_2$ are located as in FIGURE 2.

For a "plus" wind, point $21_p$ is located on the center line at a distance $$\frac{\pi R a}{720}$$

beyond point 21, $a$ being the number of degrees of advance. Line 22—21p is now drawn, crossing the axis at 26p. Angle 20—21p—22 (angle $\alpha p$) is the winding angle for this "plus" wind. From point 26p, a perpendicular line is drawn meeting line $R_2$ at 29p, and a line is then drawn sloping inward at an angle $$\alpha p - \frac{\beta p}{2}$$

(where $\beta p$ is $$\tan^{-1} \frac{\pi \tan \alpha p}{2})$$

crossing the axis at 30p. Also a line $27_p$ is drawn through point 26p making an angle ($\beta p - \alpha p$) with line 21p—22. Now with point 30p as a center and radius R an arc is drawn from the point of tangency 32p of line $R_2$ to the intersection 28p with line 27p. Now a line 34p is drawn through point 28p forming an angle $\beta p$ with center line C. This is the end form line. Line $R_2$, arc 32p—28p and line 34p then outline one-fourth of the cross-section of the spindle.

For a "minus" wind, point 21n is located closer to the axis than point 21 by a distance $$\frac{\pi R a}{720}$$

The winding angle $\alpha n$ is 20—21n—22, and angle $\beta n$ is $$\tan^{-1} \frac{\pi \tan \alpha n}{2}$$

Points 26n, 28n, 29n, 30n, 32n, arc 32n—28n and line 34n are correspondingly located.

In a package wound by such a machine, the winding angle $\alpha_x$ at any radius $r_x$ will be represented by the formula, for a positive advance:

$$\tan^{-1} \frac{R(\pi+2\sqrt{3}) \tan \alpha p}{2\left[\sqrt{4R^2-r_x^2}+\pi r_x\left(\frac{150°+\frac{a}{4}-\cos^{-1}\frac{r_x}{2R}}{180}\right)\right]}$$

where R is the radius at which the winding angle $\alpha p$ has the value $$\tan^{-1} \frac{2 \tan \beta p}{\pi}$$

$\beta p$ being the angle of the conical interior end portions.

For a negative angle, the winding angle $\alpha_x$ at radius $r_x$ is $$\tan^{-1} \frac{R(\pi+2\sqrt{3}) \tan \alpha n}{2\left[\sqrt{4R^2-r_x^2}+\pi r_x\left(\frac{150°-\frac{a}{4}-\cos^{-1}\frac{r_x}{2R}}{180}\right)\right]}$$

where R is the radius at which the winding angle has the value $$\tan^{-1} \frac{2 \tan \beta n}{\pi}$$

The length of each half of the cylindrical portions of the spindle for a positive advance is $$R\left[\frac{(360°+a) \tan \beta p - 360° \tan\left(\alpha p - \frac{\beta p}{2}\right)}{360°}\right]$$

The axial projection of the arcuate portion 14p is $$R \sin (\gamma p + \delta p)$$

where $$\delta p = \sin^{-1}\left(\cos \gamma p \tan \frac{\gamma p}{2}\right)$$

and $\gamma p$ is $2\alpha p - \beta p$.

The angle of the end form is $\beta p$.

For a negative advance, the length of the cylindrical portion is $$R\frac{(360°+a) \tan \beta n - 360° \tan\left(\alpha n - \frac{\beta n}{2}\right)}{360°}$$

The axial projection of the arcuate portion is $$R \sin (\gamma n + \delta n)$$

where $\delta n$ is $\sin^{-1} (\cos \gamma n \tan \gamma n/2)$ and $\gamma n$ is $2\alpha n - \beta n$. The end form angle is $\beta n$.

The spindles previously described have been those for use with "one" winds. For winds of other orders, the spindle is laid out as shown in FIGURES 7 to 12, which show the spindles for a "two" wind (FIGURES 7 to 9) and a "three" wind (FIGURES 10 to 12) respectively.

With reference to FIGURES 7 to 9, assuming a basic winding angle $\alpha'2$ of 15°, and a guide moving in a path G at a distance $2R(R\sqrt{3}$ in FIGURE 8) from the axis A, the leg PL of the winding triangle is AP (arced portion) plus TP (tangent portion). The arced portion AP is equal to the portion around one-fourth of the circumference (as for a "one" wind) plus an additional one-half perimeter for each order over one. For a "two" wind, then, $$AP = \frac{\pi R}{2} \text{ plus } \pi R$$

and for any other wind of order N, $$AP = \frac{\pi R}{2} \text{ plus } \pi R(N-1)$$

TP, of course, is $R\sqrt{3}$.

Therefore, $$PL = R\frac{(2\sqrt{3}-\pi+2\pi N)}{2}$$

Assuming a basic winding angle $\alpha'$, the distance 20—$22_2$ will be $$R\frac{(2\sqrt{3}-\pi+2\pi N)}{2} \tan \alpha'$$

or, for a "two" wind, $$R\frac{(2\sqrt{3}+3\pi)}{2}\tan\alpha'$$

For a positive or negative advance, the leg of the winding triangle is found by adding to or subtracting from PL an amount depending on the number of degrees of advance ($a$) and the order N. PL then becomes, for a positive advance, $$\frac{\pi R}{2}+\frac{\pi Ra}{720N}+(N-1)\left(\pi R+\frac{\pi Ra}{720N}\right)+R\sqrt{3}$$

or, $$R\left(\pi N-\frac{\pi}{2}+\frac{\pi a}{720}+\sqrt{3}\right)$$

The winding angle $\alpha'p$ for a positive advance is $$\tan^{-1}\frac{\tan\alpha'\left(\pi N-\frac{\pi}{2}+\sqrt{3}\right)}{N-\frac{\pi}{2}+\frac{\pi\alpha}{720}+\sqrt{3}}$$

while for a negative advance the winding angle $\alpha'n$ is $$\tan^{-1}\frac{\tan\alpha'\left(\pi N-\frac{\pi}{2}+\sqrt{3}\right)}{\pi N-\frac{\pi}{2}-\frac{\pi a}{720}+\sqrt{3}}$$

Angle $\beta'p$ equals $$\tan^{-1}\frac{\pi\tan\alpha'\left(\pi N-\frac{\pi}{2}+\sqrt{3}\right)}{2\left(\pi N-\frac{\pi}{2}+\frac{\pi a}{720}+\sqrt{3}\right)}$$

Angle $\beta'n$ is $$\tan^{-1}\frac{\pi\tan\alpha'\left(\pi N-\frac{\pi}{2}+\sqrt{3}\right)}{2\left(\pi N-\frac{\pi}{2}-\frac{\pi a}{720}+\sqrt{3}\right)}$$

PL or $R\left(\frac{\pi}{2}+\frac{\pi a}{720}\right)$ since $N=1$, is measured off (FIGURE 7) on C from the axis A to locate point $21_2$, and line $21_2$—$22_2$ is drawn, intersecting the axis at $26_2$. A perpendicular from $26_2$ intersects line $R_2$ at $29_2$, and a line is drawn inwardly from $29_2$ at an angle $$\alpha'_2-\frac{\beta'_2}{2}$$

intersecting the axis at $30_2$. A line $27_2$ is also drawn through $26_2$ at an angle $\beta'_2-\alpha'_2$ to line $21_2$—$22_2$. An arc is now drawn with $30_2$ as a center and R as a radius from the point of tangency $32_2$ with line $R_2$ to the intersection $28_2$ with line $27_2$. A line $34_2$ through point $28_2$ is then drawn at an angle $\beta'_2$ to the center line C. Line $R_2$, arc $32_2$—$28_2$ and line $34_2$ define the outline of one-fourth of the cross-section of the spindle.

For a negative advance, the same procedure is followed. FIGURES 10 to 12 show the forming of a spindle for a "three" wind with a negative advance. PL is set off along C from axis A in an amount $$R\left(\frac{5\pi}{2}-\frac{\pi a}{720}\right)$$

to locate point $22_3$.

Line $21_3$—$22_3$ cuts the A axis at $26_3$. A line $27_3$ is drawn making an angle $\beta'_3-\alpha'_3$ with line $21_3$—$22_3$ $\beta'_3$ being $$\tan^{-1}\frac{\pi\tan\alpha_3'}{2}$$

Next, a line through $26_3$ perpendicular to axis A cuts line $R_2$ at $29_3$. From $29_3$ a line is drawn upward and inward intersecting axis A $30_3$, angle $26_3$—$29_3$—$30_3$ being $$\alpha'_3-\frac{\beta'_3}{2}$$

An arc with radius R is drawn from the point of tangency $32_3$ with line $R_2$ to the intersection $28_3$ with line $27_3$. A line $34_3$ through point $28_3$ at an angle $\beta'_3$ to the line C gives the end form.

In such a package, the leg of the winding triangle at radius $r_x$ will be, for a positive advance, $$\sqrt{4R^2-r_x^2}+\pi r_x\left(\frac{150+\frac{a}{4N}-\cos^{-1}\frac{r_x}{2R}}{180}\right)$$

$$\text{plus }(N-1)\left(\pi r_x+\frac{a\pi r_x}{360N}\right)$$

and for a negative advance $$\sqrt{4R^2-r_x^2}+\pi r_x\left(\frac{150-\frac{a}{4N}-\cos^{-1}\frac{r_x}{2R}}{180}\right)$$

$$\text{plus }(N-1)\left(\frac{\pi r_x-a\pi r_x}{360N}\right)$$

The distance $20$—$22_N$ is $$R\frac{(2\sqrt{3}-\pi+2\pi N)}{2}\tan\alpha'$$

The winding angle $\alpha'p$ at radius $r_x$ is therefore for a positive advance $$\tan^{-1}\frac{R(2\sqrt{3}-\pi+2\pi N)\tan\alpha'N}{2\left[\sqrt{4R^2-r_x^2}+\pi r_x\left(\frac{150+\frac{a}{4N}-\cos^{-1}\frac{r_x}{2R}}{180}\right)+(N-1)\left(\pi r_x+\frac{a\pi r_x}{360N}\right)\right]}$$

where R is the radius at which the winding angle $\alpha'p$ equals $$\tan^{-1}\frac{2\tan\beta'p}{\pi}$$

$\beta'p$ being the angle of the conical end portions.

For a negative advance, winding angle $\alpha'n$ at radius $r_x$ is $$\tan^{-1}\frac{R(2\sqrt{3}-\pi+2\pi N)\tan\alpha'}{2\left[\sqrt{4R^2-r_x^2}+\pi r_x\left(\frac{150-\frac{a}{4N}-\cos^{-1}\frac{r_x}{2R}}{180}\right)+(N-1)\left(\pi r_x-\frac{a\pi r_x}{360N}\right)\right]}$$

where R is the radius at which the winding angle $\alpha'n$ is $$\tan^{-1}\frac{2\tan\beta'n}{\pi}$$

$\beta'n$ being the angle of the conical end portions.

For any such package, by inspection $\beta'p$, $\beta'n$, $r_x$ and $\alpha'$ can be found. From these, $\alpha'p$, $\alpha'n$ and R can also be found and it can be determined whether the package satisfies the desirable conditions.

The spindle of such a machine, for a positive advance, has a cylindrical portion of length $$2R\left[\left(\pi N-\frac{\pi}{2}+\frac{\pi a}{720}\right)\tan\alpha'p-\tan\left(\alpha'p-\frac{\beta'p}{2}\right)\right]$$

The projection of the arcuate portion on the axis A is $$R\sin(\gamma'p+\delta'p)$$

where $$\delta'p \text{ is } \sin^{-1}\left(\cos\gamma'p\tan\frac{\gamma'p}{2}\right)$$

and $\gamma'p$ is $2\alpha'p-\beta'p$.

The angle of the end form is $\beta'p$.

For a negative advance, the cylindrical portion has a length of $$2R\left[\left(\pi N-\frac{\pi}{2}-\frac{\pi a}{720}\right)\tan\alpha'n-\tan\left(\alpha'n-\frac{\beta'n}{2}\right)\right]$$

The projection of the arcuate portion on axis A is $$R\sin(\gamma'n+\delta'n)$$

where $$\delta'n \text{ is } \sin^{-1}\left(\cos\gamma'n\tan\frac{\gamma'n}{2}\right)$$

and $\gamma'n$ is $2\alpha'n-\beta'n$.

The end form angle is $\beta'n$.

In other words, the distance across the base layer (layer of radius R) corresponding to distance 33—33' in FIGURE 2 is $$2R\left[\left(\pi N\frac{\pi}{2}\pm\frac{\pi a}{720}\right)\tan\alpha'-\tan\left(\alpha'-\frac{\beta'}{2}\right)+\sin(\gamma+d')\right]$$

In each modification, the end form generating line will intersect the axis of the spindle at a distance from the center line C equal to $$R\left[\left(\pi N-\frac{\pi}{2}+\frac{\pi a}{720}\right)\tan\alpha+\sin(\gamma+\delta)\right.$$
$$\left.-\tan\left(\alpha-\frac{\beta}{2}\right)-\cos(\gamma+\delta)\tan\beta\right]$$

FIGURE 13 shows a package produced according to the invention where the ordinary universal wind machine, such as shown in the patent to Wardwell, No. 480,157, is used but with the guide moving in a fixed line. This package has a central axial core with a cylindrical center part 62, intermediate parts 64 of outwardly decreasing cross-section, and outwardly flaring ends 66.

FIGURE 14 shows a package produced on a machine such as that shown in the Taylor and Whipple Patent No. 2,634,918, in which, by varying the relative speed of the spindle and guide, a radial hole is produced into the axial core through which the inner end of the material can be drawn out. The central axial core has the same shape, but there is a radial hole 70 through which the inner end of the material can be withdrawn.

Such a package may also be produced with alternating plus and minus winds, as described in my application for Winding Flexible Material, S.N. 344,874, filed March 26, 1953, now Patent No. 2,767,938.

The general theory of why the design of my mandrel and shape of winding is so advantageous is not easy to define. However, I believe I have proved that there is a shape (or formation) that incorporates a specific shortest path on its surface, the shape and the path being so contrived that a winding machine of the quick traverse type causes a wound substance to form continuously over that path in such a way that the relative shape and its relative shortest path are retained throughout the growth of any winding; and that this combination results in the greatest possible stability for the wound substance both during the winding and in the unsupported package of wound substance that results.

Another part of the theory is that I have invented a wound package formed of overlaid loops and a shape on which to wind it, each half of each loop being composed of a combination of cylindrical helix and great circle, the great circle being at an angle complementary to the angle of the helix, the whole contrived so that, regardless of the ratio of degrees of turn of cylindrical helix to the degrees of turn of reverse great circle, the half loop will always follow approximately the same relative path.

Another point is that I have invented a wound package formed of overlaid loops, and a shape on which to wind it, in which no part of any loop is subjected to angular deflection.

Every loop of such a package contains, at its outer end, two great circle portions which are complementary to its cylindrical helix portions.

The most stable windings, composed of a number of layers, appear to be those in which there is the least rapid change of winding angle from layer to layer. From this it follows that the innermost and outermost stages are generally somewhat less stable; also, that the central layers of a large diameter design are somewhat more stable than a wider span of layers of a small diameter design. However, when solving a particular problem of mechanics of winding or to obtain a specific result in the wound package, there are possible advantages in all stages that should be considered.

If there are limitations in the machine to be used, it is obvious that more substance can be built into a winding that starts at a minimum stage and proceeds to a maximum. Also, if control of the wound substance during payout is being sought and there is a limit to the width of throw of the guide that prevents winding at a wider angle, the inner stages, at any angle of wind, have relatively more end closure than the outer stages. This closure tends to control the loops during payout.

There is a mechanical and a control advantage in winding the outer stages. The shorter the relative distance from guide to tangent point, the more the line is definitely controlled by the guide. Vibration, irregularities of surface, wound substance condition, and machine gearing have considerably less effect on the short line. Also, the shorter the relative distance, the greater the mechanical advantage. In the early stages a great amount of guide action results in little substance wound. As the winding progresses, more and more substance is wound for the same amount of guide action.

If the ratio of turn of spindle to stroke of guide is adjustable and the substance to be wound will payout satisfactorily from such a wind, a multiplex wind should be considered. Such a wind has more than two turns of the spindle to one complete stroke of the guide, the overage being added usually in multiples of 180°.

Since this method allows unlimited choice of angles of wind, the angle of wind should be given careful consideration. It depends on the machine to be used, the substance to be wound, and the result to be achieved. Some substances that are subjected to damaging shearing action at a cross-over angle of 90° are amply protected at angles either considerably smaller or larger than this, say at approximately 30° or 120°. Also some substances will payout at high speeds from small angle winds while others will do better at wide angles, depending on the type of substance, its relative spring characteristics, and its cross-sectional shape and on the mass, shape, and size desired in the finished package.

This same method can be used to produce mandrels with variations in center section shapes similar to those shown in my patent application S.N. 344,875, filed March 26, 1953, now Patent No. 2,828,092, and to produce mandrels in which the center section is conical in one direction only rather than in two.

It should be apparent that this method of producing and adjusting machinery, which makes possible the laying on of slippery substances under minimum tension and which results in maximum utilization of self support characteristics, provides unlimited opportunities for improving both the mechanics of winding and the packages that result. It should open up to all bendable substances types of winding machines and forms of winding that have heretofore been reserved for specific substances whose peculiar characteristics have allowed satisfactory results with relatively undeveloped winding processes. Although the elements involved and the advantages to be gained are too numerous to list in detail, one versed in this art should be able to balance one factor against another so as to succeed in designing satisfactory, self supporting packages for many substances formerly thought to need strong support and for many substances heretofore found impracticable to wind.

After consideration of the characteristics of the substance to be wound, the mass or amount of it to be built into a package, the type of payout, and the shape of the finished package preferred, some of the most important factors to be considered in designing the winding are the minimum diameter, the ratio or order, the angle at which to wind, the advance of the wind, the particular shape and the final diameter. With these determined, anyone versed in this art can use this system of design both to design the mandrel and end forms on which to wind and to set or adjust the machinery so as to achieve the winding.

FIGURES 15 to 18 show the collapsing of various winds according to the invention.

In selecting winds to be produced by this new method, the designer is not limited to the plus, minus, and combination plus/minus advance winds of my Patents No. 2,634,916 and No. 2,634,922, issued April 14, 1953 and applications S.N. 344,874, now Patent No. 2,767,938 and S.N. 344,875, now Patent No. 2,828,092 filed March 26, 1953, which payout through a radial hole.

Industry has been finding many uses for end payouts from cops, spools, and reels and from specialized packages. In general, these have been limited to over end (outside) payouts, with consequent difficulties. Although relief from the cost of cops, spools, and reels, and from some of the intricacies of specialized packages provides one incentive for replacing the present types of packages with self-supporting windings, the center payout made possible by self-supporting winds, with its control of both payout and centrifugal loop and its first-in-first-out principle, offers additional incentive in many cases.

For either center or over end payout, the plus, minus, and combination plus/minus advance winds, wound by the new method but without the radial hole, can be used. Of course, windings with the radial hole can be payed off from the end, if the user shoulder prefer it, by ignoring the radial hole. However, there are advantages in winding without the hole if it is known to be not needed.

In winding many substances with the new method the advance can be closed up considerably, so as to reduce the air spaces within the layers, without causing damage to the substance. With substances of this type and especially with others that will not allow closing the advance, the finished mass can be reduced by collapsing the wound package under pressure. Greater protection in packaging, improved control of payout, higher speed of payout, and greater linear speed with less r.p.m. in winding are other advantages that can be gained through this collapse.

Various forms of collapsed winds are possible, each type having different characteristics that are advantageous. First, there is partial or complete collapse circumferentially. This includes winds both with and without the radial hole.

Second, there is partial or complete collapse axially. This also includes winds both without and with the radial hole, it being specified that the radial hole be kept open by the insertion of either a temporary or permanent plug or tube while the other portions are collapsed.

Although I do not claim to have invented all forms of collapsed winds as such, packages wound with my method make possible many improvements in this specialized art and collapsed winds which originate from this method have definite advantages.

FIGURE 15A shows a package 70a produced according to the invention with a radial hole 72. This is a "one" wind. The hole may be omitted if desired.

FIGURE 15B shows the same package 70b collapsed radially by central pressure. Upon such collapse, the central portion 74b is more reduced in diameter than the ends 76b.

FIGURE 15C shows one end 78c of the package 70c collapsed to the same diameter as the central portion 74c. Both ends may be so collapsed if desired.

FIGURE 16A shows a "two" wind package 80a. FIGURE 16B shows the same package 80b radially compressed and elongated. FIGURE 16C shows the same package 80c reduced in diameter at several points. FIGURE 16D shows the same wind 80d further elongated with one end 82d maintained at the same diameter as in FIGURE 16A.

Figure 17B:
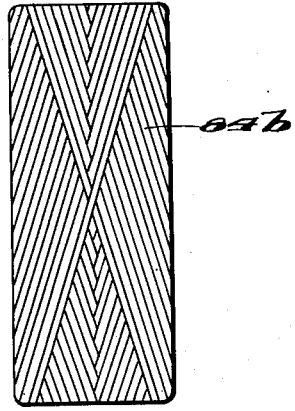
FIGURE 17B shows the package of FIGURE 17A collapsed.

In FIGURE 17A, package 84a is a "one" wind with a narrow winding angle. FIGURE 17B shows the same package 84b compressed axially.

Figure 18:
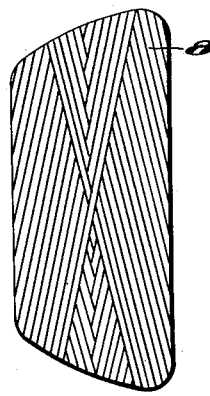
FIGURE 18 shows a further form of package embodying the invention.

FIGURE 18 shows a conically shaped package 85 collapsed axially.

Figure 19B:
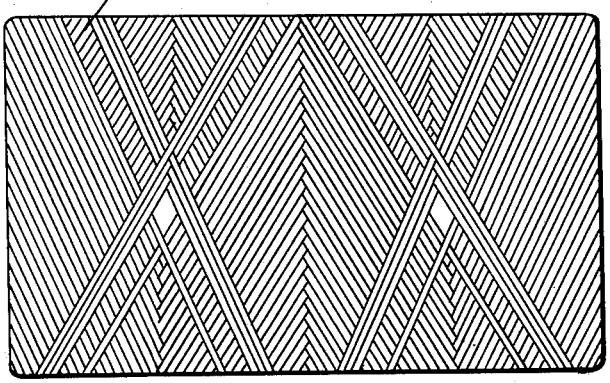
FIGURE 19B shows the package of FIGURE 19A in collapsed condition.
Figure 19A:
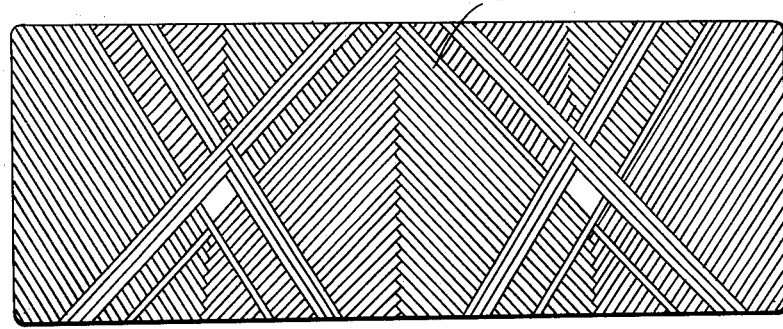
FIGURE 19A shows a further package embodying the invention.

The package 86a of FIGURE 19A is a "two" wind with a small winding angle. The same package is shown axially collapsed at 86b in FIGURE 19B.

The package 88 of FIGURE 20A is wound in the manner described above with a radial opening 90. This package is then collapsed circumferentially by enlarging the radial opening by pressure on its ends in the direction of the arrows 92. This will then assume the form 88b of FIGURES 20B and 20C, the bights of the figure 8's then forming piles lying side by side and of frustoconical shape.

For dispensing such a package, I may provide a board or flat plate 94 (FIGURES 21A to 21C) provided with notches 96 through which extend the legs 98 of a U-shaped spring member, whose legs carrying slightly hooked blocks 100 for engaging the narrow waist of the package 88b. The ends of the package may be engaged by arms 102 pivoted at 104 on uprights 106 carried by board 94, and pressed in any suitable manner, as by their own weight, against the package ends.

FIGURE 22 shows package 88b enclosed in a box 108, with its free inner end guided out of the box by tube 110.

The package 112 of FIGURES 23A and 23B can be formed from a multiple-order wind, such as that of FIGURE 16A but provided with radial openings, by opening them up in the same manner as in FIGURES 20A to 20C.

In FIGURE 24 a package such as 86b is enclosed in a box 114 having a cover 116 in which is fixed a tube 118 through which the inner end 120 of the material is led out. The box has a bottom cone 122 and a top cone 124, the latter having a central hole therein. These cones are formed at the angle of the interior flaring end surfaces of the package, and rest against them to hold the package against distortion and to ensure proper payout.

In addition to collapse, another factor which offers a way to control payout of some substance is partial, or total, release of tension in the coils of the package. This is brought about by slacking slightly, while under control, the outer end line of the package. With some substance, a gentle shaking of the package helps to transfer and equalize the slackening throughout all the coils of the package.

Although this slacking off is an aid to collapsing and usually results in collapse to some degree, packages can be collapsed under pressure without such release. This release of tension in the coils removes some of the tendency of the coils to resist, by their own spring, the torsion, or twisting and turning, to which they are subjecting while paying out. It thus results in a smoother running line which has little danger of interfering with later neighboring coils. It is effective in paying out through a radial hole as well as from the inside and outside, over the end, of self-supporting packages.

The invention further contemplates improvements in the spools and the machines used for winding many substances, especially flat substances such as tape. For any except truly random winds, a spool (or reel) with incorrectly angled flanges, or a machine setting incorrectly planned for distance of guide from axis or for width of guide stroke, will cause a misalignment of the wound substance which is apt to result in damage to the substance either in the wound package or during subsequent unwinding.

In many cases, the results of such misalignments are important enough to cause the use of involved and expensive machinery which either eliminates the misalignment or removes some of its most apparent misformations, as shown, for example, in Patent No. 2,513,815, issued to O. G. Nelson, July 4, 1950. In other cases, misaligned windings are used because no simple means of improvement have been known.

In practically all cases, improved winding is now possible through the use of this method. Since the winding of flat strip, or tape, has always proved difficult, a spool for winding ½" wide strip, with the further specification that a large mass is to be achieved, is shown.

One of the first things to be considered in winding strip is the minimum radius of the sphere or end arc on which to wind it. FIGURE 25 gives some idea of the problem by showing the curvature of arcs at several radius lengths compared to a ½" flat width. In this drawing, it appears that a 3" radius would be satisfactory. This leaves the substance lying on about 8° of the circle. At a smaller radii, there would be such a contrast between the curve and the flat that the edges of the ½" wide flat substance could be expected to ripple or the center part of the strip might become stretched. This has to do with the arcuate parts of the spool only, as the strip will lie flat, in helical form, on the cylindrical central portion. This minimum sphere radius is the radius of the cylinder for the minimum stage.

In this figure, various arcs ($126_1$, $126_2$, $126_3$, $126_4$) are drawn at 1" intervals about center 126. Lines 130, $130^1$, spaced ½" apart represent the width of the tape sections $132_1$, $132_2$, $132_3$, $132_4$. It will be apparent that at 3" or over the tape will deviate but little from the arc.

The next consideration is the maximum radius. This decision is related to the final mass to be achieved and to many factors based on either the uses of the spooled substance or the machine to be used and its limitations. However, in this case, it was arbitrarily selected at 12", with a deduction of ½" for safety in operation. This maximum radius determines the radius of the base stage.

Having determined the minimum and maximum radii, the next consideration is the angle at which to wind. The problem is to lay the consecutive turns approximately next to each other in all layers. They are not to be allowed to overlap on the one hand but, on the other, if kept too far apart, the wind will contain more air spaces than necessary. This concerns the turns on the cylindrical portion rather than the end formation and can be worked out through the use of cylindrical generating line angles, the generating line angle being such that at least ½" of progress along the cylinder is gained for each 360° of turn.

FIGURE 26 shows the shape of a spool of 3" diameter using a winding angle $\alpha_+$ of 3° 30', although an angle as small as 1° 30' could be used. Aside from the winding angle, the count, or ratio of turns of spindle to half strokes of the guide, and the advance are the two factors remaining. The count is directly related to the mass. It can be extended indefinitely until sufficient cubic space to contain the required amount of substance is within the minimum and maximum diameters. A count of 30 seems satisfactory. The advance is not of great importance in this kind of wind as each half stroke of the guide from one side of the winding to the other lays almost a completely covered layer of substance. An advance of $-12°$ was selected for illustration. As formerly, this is the amount of advance measured along the center line of the spool.

Because the drawing plots the helix of the center line of the ½" wide strip, and adjustment of ¼" in width must be made for the placing of the end cones. This adjustment is made by measuring ¼" additional on the spherical end of the center portion of the spool and joining the end cone lines and the limit line for the basic layer, through the new point.

In forming such a spool, we will take for example a machine which is to wind a tape of half-inch width ($w$) on a spool, the guide being located at a distance of 12 inches (2R) from the axis of rotation A—A, and the tape to make 30 turns around the spool ($Ct=30$) in each layer, with an advance ($a$) of $-12°$. The winding angle ($\alpha_+$) is 3° 30'. The half-length (G) of the guide stroke should be $$\frac{R[\pi(Ct-1)+2\sqrt{3}]}{2\cos\alpha}$$

or 17.35" determining thus the point $22t$. I also draw lines $R_1$, $R_2$ at a distance R from axis A.

From $22t$, I draw a winding line 110 inclined towards the center line C and at an angle ($\alpha nt$) to the center line equal to $$\tan^{-1}\frac{G}{R\left[\left(\frac{\pi ct-1}{2}\right)1+\frac{a}{90Ct}+\sqrt{3}\right]}$$

which is 3° 30.5'. This line crosses the axis at point 111. From point 111, I draw end generating line 112 at an angle to the center line of $2\alpha nt-\beta nt$ or 1° 31' where $$\beta nt=\tan^{-1}\frac{\pi\tan\alpha nt}{2}$$

I also draw a perpendicular 113 from point 111 to line $R_1$ at 114.

From point 114, I draw line 115 sloping towards center line C at an angle $$\alpha nt-\frac{\beta nt}{2}$$

or 0° 45.5' intersecting axis A at 116. From 116, I draw perpendicular $117_1$, $117_2$ to lines $R_1$, $R_2$. With 116 as a center and radius R, I then draw arcs $118_1$, $118_2$. Through points $119_2$ where arc $118_2$ intersects line 112 and through the corresponding point on arc $118_1$ designated by line $119_2$—$119_1$ vertical to the axis, I draw (broken) lines $120_1$, $120_2$ at angles $\beta nt$ (or 5° 30') to the center line C. Since the winding line represents the center of a one-half inch strip, a one-fourth inch space must be added, and lines $121_1$, $121_2$ representing the end form lines are drawn parallel to lines $120_1$, $120_2$ but spaced outwardly one-fourth inch therefrom.

Now, assuming a 3″ radius ($R_x$) for the finished spool, I draw from point 22t a line 122 at an angle $$\tan^{-1} \frac{G}{R_x\left[\frac{\pi(Ct-1)}{2}\left(1+\frac{a}{90Ct}\right)+\sqrt{3}\right]}$$

or 6° 44.5′. This crosses axis A at 123, and a perpendicular 124 is drawn from point 123 to line $R_2$ at 125. From 125, a line 126 is drawn inward at angle $$\alpha nt - \frac{\beta nt}{2}$$

intersecting axis A at 127. With 127 as a center and radius $R_x$, arcs $128_1$, $128_2$ are drawn to intersect flange lines $121_1$, $121_2$. Lines $R_{x1}$, $R_{x2}$, arcs $128_1$, $128_2$ and lines $121_1$, $121_2$ then define one-half of the spool.

In FIGURES 27 and 28, a spindle is shown formed of several parts capable of being withdrawn from inside the package. The shaft of the winding machine is shown at 140. Around this shaft fit five parts 141, 142, 143, 144, 145 which together are shaped to make up the cylindrical portion and the portions of outwardly decreasing diameter of the spindle. These parts project at each end into recesses provided in conical end forms 146, which can be fixed on the shaft by collars and set screws 147.

With this arrangement, after a package is wound, the set screws can be released and the collars and spindle parts are pulled off the shaft, and the various parts 134 to 145 are pulled out through the ends of the package, part 141 being removed first. They can then be reassembled on the shaft and another package can be wound.

This same method can, as shown in FIGURES 29 and 30, be used to produce mandrels with variations in center section shapes similar to those shown in my patent application SN 344,875, filed March 26, 1953, now Patent No. 2,828,092 and to produce mandrels in which the center section is conical in one direction only rather than in two.

While I have described herein some embodiments of my invention, I wish it to be understood that I do not intend to limit myself thereby except within the scope of the claims hereto or hereinafter appended.

I claim:
1. A package of flexible material wound in a series of figure 8's in which the crossovers of successive figure 8's are angularly displaced around the package and a succession of such figure 8's progressing once around the package forms a layer, said package having an internal surface defining an axial opening therethrough, said surface having a cylindrical central portion, a portion of decreasing diameter at each end of said central portion, and end portions flaring outwardly at an angle $\beta'$ to the axis of the package, the width of the layer at radius R being

$$2R\left[\left(\pi N - \frac{\pi}{2} + \frac{\pi a}{720}\right)\tan\alpha' - \tan\left(\alpha' - \frac{\beta'}{2}\right) + \sin(\gamma' - \delta')\right]$$

where $a$ is the advance which may be positive or negative, N is the order of the wind, $\alpha'$ is $$\tan^{-1}\frac{2\tan\beta'}{\pi}$$

$\gamma'$ is $2\alpha' - \beta'$, $\delta$ is $\sin^{-1}(\cos\gamma'\tan\gamma'/2)$, and R is the radius at which the winding angle is $\alpha'$.

2. A package of flexible material wound in a series of figure 8's in which the crossovers of successive figure 8's are angularly displaced around the package, said package having an internal surface defining an axial opening therethrough, said surface having a cylindrical central portion, a portion of decreasing diameter at each end of said central portion, and end portions flaring outwardly at an angle $\beta'$ to the axis of the package, the winding angle $\alpha_x$ at any diameter $r_x$ of the package being represented by the formula:

$$\tan^{-1}\left[\frac{R(2\sqrt{3}-\pi+2\pi N)\tan\alpha'}{2\left[\sqrt{4R^2-r_x^2}+\pi r_x\left(\frac{150+\frac{a}{4N}-\cos^{-1}\frac{r_x}{2R}}{180}\right)+(N-1)\left(\pi r_x+\frac{a\pi R_x}{360N}\right)\right]}\right]$$

where $a$ is the advance which may be positive or negative, N is the order of the wind, $\alpha'$ is $$\tan^{-1}\frac{2\tan\beta'}{\pi}$$

and R is the radius at which the winding angle is $\alpha'$.

3. A package of flexible material wound in a series of figure 8's in which the crossovers of successive figure 8's are angularly displaced around the package, said package having an internal surface defining an axial opening therethrough, said surface having a cylindrical central portion, a portion of decreasing diameter at each end of said central portion, and end portions flaring outwardly at an angle $\beta'$ to the axis of the package, the width of the layer at radius R being $$2R\left[\left(\pi N - \frac{\pi}{2} + \frac{\pi a}{720}\right)\tan\alpha' - \tan\left(\alpha' - \frac{\beta'}{2}\right) + \sin(\gamma' - \delta')\right]$$

where $a$ is the advance which may be positive or negative, N is the order of the wind, $\alpha'$ is $$\tan^{-1}\frac{2\tan\beta'}{\pi}$$

$\gamma'$ is $2\alpha' - \beta'$, $\delta$ is $\sin^{-1}(\cos\gamma'\tan\gamma'/2)$, and R is the radius at which the winding angle is $\alpha'$.

4. A spindle for winding machines having a cylindrical portion of radius R and of length $$2R\left[\left(\pi N - \frac{\pi}{2} + \frac{\pi a}{720}\right)\tan\alpha' - \tan\left(\alpha' - \frac{\beta'}{2}\right)\right]$$

at each end of the cylindrical portion a spherical portion of outwardly decreasing diameter of radius R and projecting on the spindle axis a distance $$R\sin(\gamma' + \delta')$$

where $\gamma'$ is $2\alpha' - \beta'$, and $\delta'$ is $\sin^{-1}(\cos\gamma'\tan\gamma'/2)$, and outwardly flaring end forms at an angle $\beta'$ to the center line normal to the axis, where $\alpha'$ is $$\tan^{-1}\frac{2\tan\beta'}{\pi}$$

$a$ is the chosen advance which may be positive or negative, and N is the order, which is an integral multiple of one-half.

5. A spindle as claimed in claim 4 having the cylindrical and spherical portions formed of a plurality of parts divided by planes substantially parallel to the spindle axis, each of said parts having, in planes normal to the spindle axis, its greatest dimension less than $$R \cos(\gamma' + \delta')$$

References Cited in the file of this patent

UNITED STATES PATENTS

| | | |
|---|---|---|
| Re. 9,605 | Palmer | Mar. 15, 1881 |
| Re. 11,856 | Wardwell | Sept. 18, 1900 |
| 408,842 | Mitchell | Aug. 13, 1889 |
| 1,071,248 | Mackie | Aug. 26, 1913 |
| 1,592,432 | Barry | July 13, 1926 |
| 2,165,018 | Taylor | July 4, 1939 |
| 2,254,221 | Hubbard | Sept. 2, 1941 |
| 2,554,615 | Dahle | May 29, 1951 |
| 2,614,772 | Epstein | Oct. 21, 1952 |
| 2,634,922 | Taylor | Apr. 14, 1953 |
| 2,634,923 | Taylor | Apr. 14, 1953 |
| 2,740,589 | Keith | Apr. 3, 1956 |
| 2,767,938 | Taylor | Oct. 23, 1956 |
| 2,828,092 | Taylor | Mar. 25, 1958 |

FOREIGN PATENTS

| | | |
|---|---|---|
| 68,168 | Switzerland | Apr. 15, 1914 |
| 295,278 | Great Britain | Sept. 20, 1928 |
| 405,610 | Italy | Aug. 23, 1943 |